March 14, 1939.  W. W. BRITTAIN  2,150,262
SHUT-OFF DEVICE FOR FIRE HOSE
Filed June 4, 1938  2 Sheets—Sheet 1
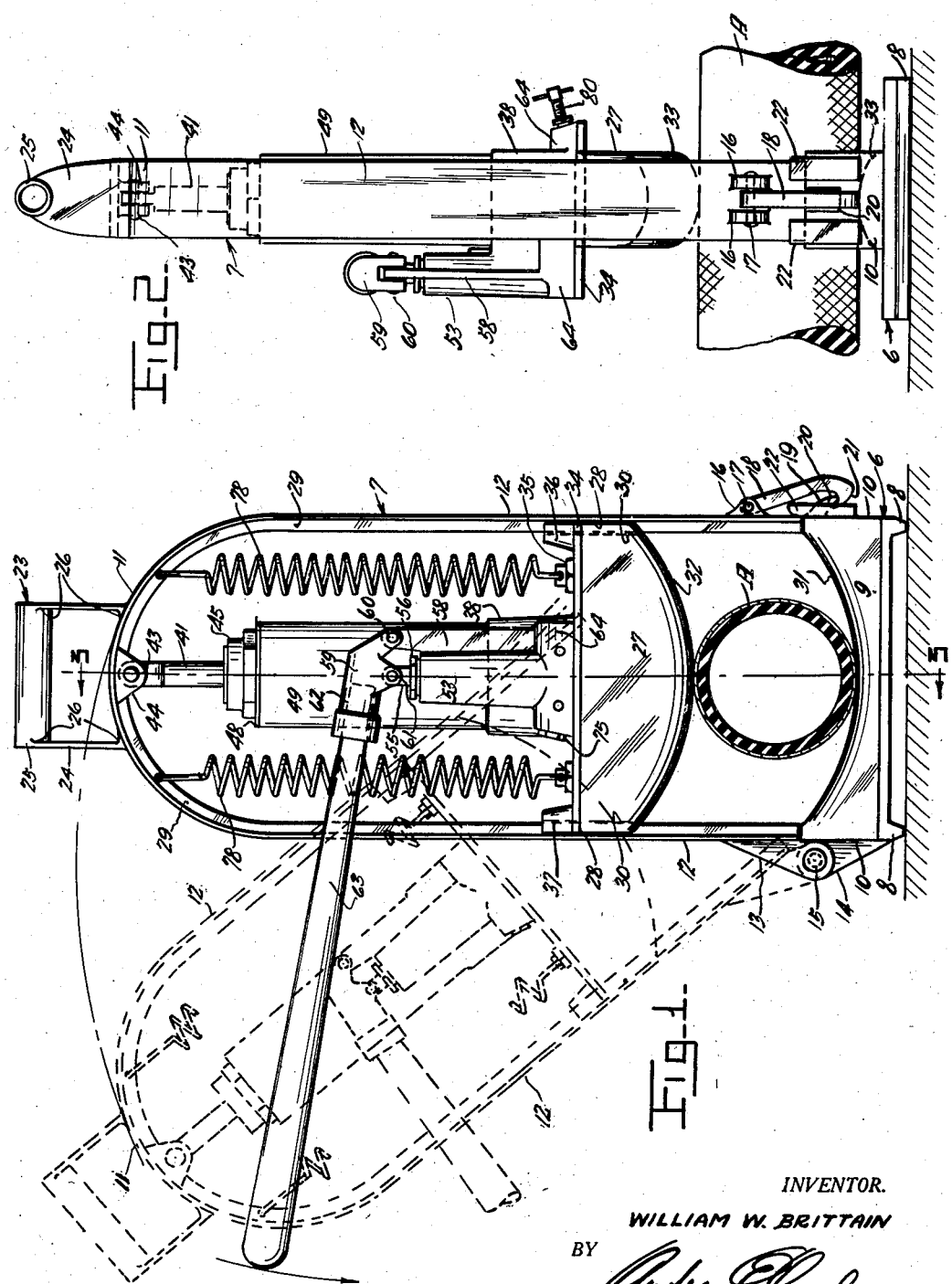
INVENTOR.
WILLIAM W. BRITTAIN
BY
ATTORNEY.

March 14, 1939. W. W. BRITTAIN 2,150,262
SHUT-OFF DEVICE FOR FIRE HOSE
Filed June 4, 1938 2 Sheets-Sheet 2
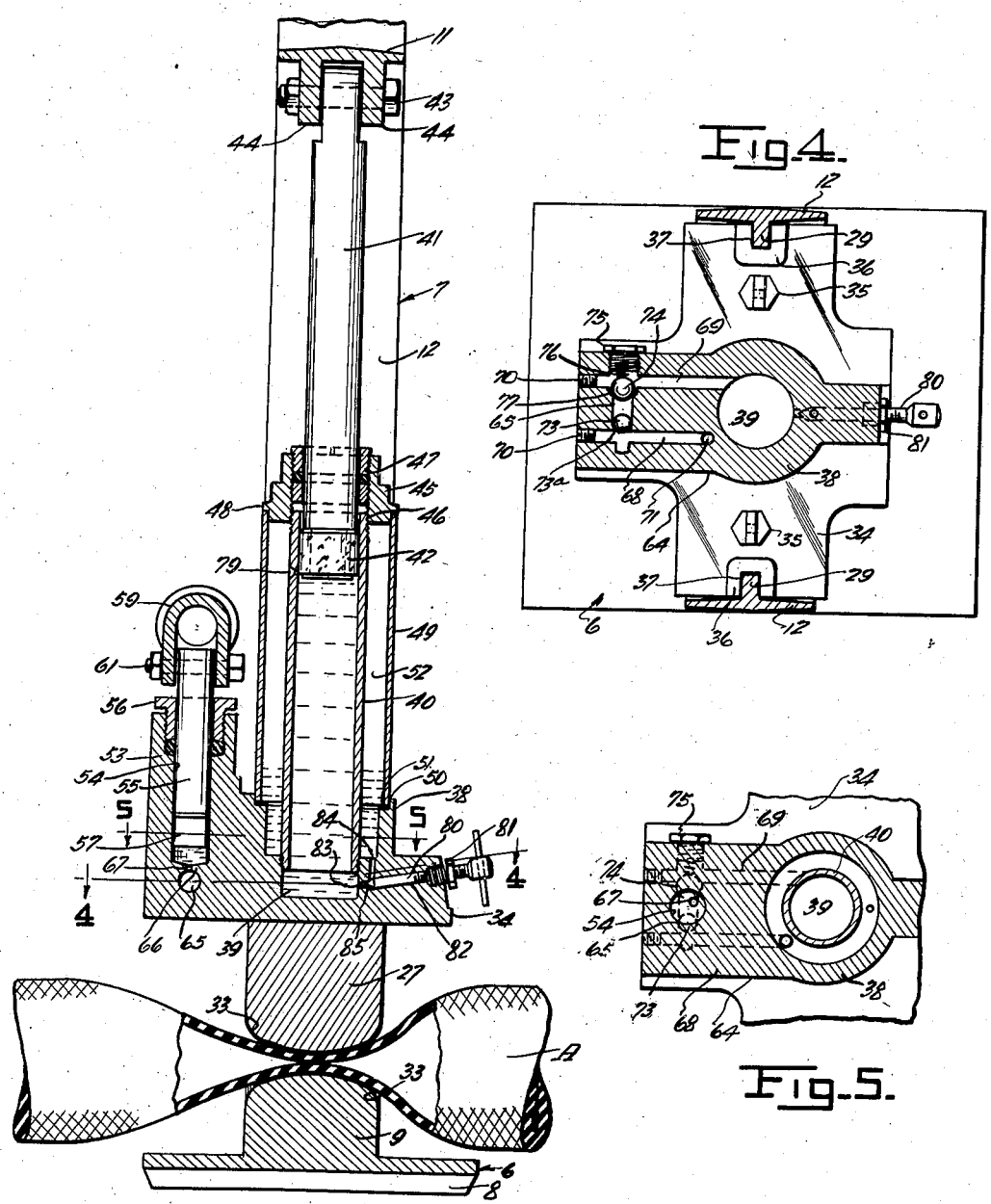
INVENTOR.
WILLIAM W. BRITTAIN
BY
ATTORNEY.

Patented Mar. 14, 1939

2,150,262

UNITED STATES PATENT OFFICE 2,150,262

SHUT-OFF DEVICE FOR FIRE HOSE

William W. Brittain, Minneapolis, Minn., assignor of one-half to John R. Long, Minneapolis, Minn.

Application June 4, 1938, Serial No. 211,915

9 Claims. (Cl. 251—5)

This invention presents a hydraulic shut-off device for temporarily shutting off the flow of a fluid through a rubber, or other flexible, hose.

The device here in mind is particularly suitable for employment in connection with the water hose used in fire fighting equipment and, in order to facilitate the proper understanding of the functions and advantages of the invention, the particular situation in which it finds use will be briefly discussed. In the practice of fire fighting a great number of engines and pumper units are frequently used, and the separate hose thereof are run around the street and vicinity of the fire in apparent confusion and as dictated by the exigencies of the particular location and fire. This is of no disadvantage except at such times as it may be necessary (and it frequently is) to change nozzles, couple on other lengths of hose, and perform similar operations. During these times it is, of course, necessary to shut off the flow of water through the hose and hitherto it has been the custom for several men to trace back the hose to its particular pumper and there shut off the water. This is a time consuming task at best, and is sometimes well nigh impossible in the confusion attendant to a large fire, and it is much more practicable to provide some means by which the water may be shut off at any place along the length of the hose at which the firemen may be working, as will be readily apparent. For this purpose there has been used a scissor-like device to pinch the hose to a closed condition, but this device, in order to provide sufficient leverage to overcome the very high pressure in the hose, has been necessarily of very large and heavy construction, making it difficult to carry about and use.

Having in mind the foregoing facts, it is the primary object of my invention to provide a compact and relatively light weight device which may be readily carried about and applied to the hose at any point by one man, and then easily operated by hydraulic pressure to pinch the hose and shut off the flow of water therethrough for any desired length of time.

Another, and important, object is to provide a device which may be used not only to shut off the flow of water through the hose, but also to control the flow of water therethrough. This is important for the reason that the water must be admitted gradually through the hose after being shut off in order to prevent a sudden pressure from straightening the slack hose and possibly injuring the men holding it.

Another object is to provide a shut-off or pinch-cock device, for pinching a fire hose to shut off the water flow, which comprises a frame adapted to be opened to fit over the hose and pinching members which may be moved together by hydraulic pressure to engage the walls of the hose and pinch them shut.

Another object is to provide a device of this kind in which provision is made to prevent injury to the hose by the automatic release of hydraulic pressure when the hose has been fully shut off. The said automatic release does not free the hose of normal pinching pressure, but this function is provided by a separate manually operated relief valve which operates to relieve the pressure entirely and allow the pinching members to spread apart by spring means so that the hose is released.

The foregoing and other objects of my invention will be made apparent in the course of the following detailed description, reference being had to the accompanying drawings, wherein:

Fig. 1 is a frontal elevation of my device, showing the same arranged over a hose in position for pinching the same, showing the hose in cross section, and in dotted lines showing the device as opened and with its upper part swung aside to clear the hose.

Fig. 2 is a side or edge view of the device as shown in Fig. 1.

Fig. 3 is an enlarged vertical section along the line 3—3 in Fig. 1, and showing the hose as pinched to shut off the water flow.

Fig. 4 is a horizontal cross section along the line 4—4 in Fig. 3.

Fig. 5 is a fragmentary cross section taken along the line 5—5 in Fig. 3.

Referring now more particularly and by reference characters to the drawings, my invention comprises a base member 6 and swinging frame or head member 7. The base 6 is wide and flat, and has ribs or cleats 8 which are designed to prevent creeping or tilting action of the base when same is rested on the street or ground. An anvil or anvil block 9 is mounted, or cast, on the base 6 medially thereof, and extends entirely across the base with its ends 10 aligned with the lateral margins of the base. The head frame 7 is of inverted U-shaped form comprising the rounded bight 11 and depended, spaced, and parallel legs 12 which at their free or open ends will just align with the ends 10 of the anvil block 9. One leg 12 has cast hinge ears 13 which receive a similar cast hinge ear 14 on one end of the block 9, and these ears are apertured to pivotally receive a transverse hinge pin or bolt 15. The opposite leg 12 carries lugs 16 which carry a pin or bolt 17 by which a latch 18 is pivotally mounted, and the lower hooked end 19 of this latch engages a catch 20 formed on the opposite end 10 of the block 9.

The foregoing assembly is such that the head frame 7 will be normally retained in upright position over the base 6 and with the lower ends of the legs 12 in contact with the upper corner portions of the anvil block 9. However, by releasing the latch 18 from the catch 20, the frame 7 may be swung laterally to one side on the hinge comprising the elements 13, 14, and 15, thus swinging the opposite leg upwardly from the anvil block. This is shown in dotted lines in Fig. 1. When the frame 7 is then swung back to vertical position the tapered or angular faces 21 of the latch 18 and catch 20 will cam and guide the latch into locking engagement to again lock the frame in position. To prevent the lower ends of the legs 12 from spreading, stop members 22 are formed on the block 9 and extend upwardly therefrom to engage against the outer side of the latched leg. The hinge assembly, of course, will prevent spreading of the other leg.

A handle 23 is provided atop the head frame 7 by extending spaced arms 24 upwardly from the bight in spaced relation, and joining them by a short length of tubing 25. The parts are welded, or otherwise suitably secured together, as indicated at 26. This handle serves as a convenient means for carrying the device as well as for swinging the frame to open and closed positions, as described.

A pressure or head block 27 is provided, and slidably mounted at its ends 28 between the frame legs 12. The frame 7 is fabricated from T-shaped stock (cross section) and the legs 12 have the integral web or rib 29 turned inwardly to serve as guide means engaging grooves 30 cut in the said ends 28 of the block 27. This mounting permits the block to move upwardly and downwardly within the frame 7, but prevents it from being removed therefrom. Attention is directed to the lengthwise arcuate contour of the adjacent or meeting faces of the blocks 9 and 27. The anvil block 9 has its upper face or edge 31 concaved while the lower face 32 of the pressure block 27 is convexed to fit nicely down against the anvil block. Both of these blocks are also rounded off transversely, as indicated at 33. As a result of this proportioning of the parts, a fire hose A or the like may be placed or rested upon the anvil block 9 where it will be retained in a medial position by the concavity thereof. The pressure block may then (by means to be described) be moved downwardly to pinch the hose (Fig. 3) and prevent the flow of water therethrough. The rounded faces of the blocks prevent injury to the hose and facilitate the pinching together of the walls thereof, as will be readily apparent.

A base plate 34 is secured atop the pressure block 27 by cap screws 35, and has the bosses 36 provided with grooves 37 to slidably engage the guide ribs 29 and increase the length of bearing between the block and the legs 12. This base plate carries the annular base 38 at a medial point on its upper side, and has a smaller, concentrically located, tapped socket 39 into which is threaded the lower end of a tubular upright member 40 forming a hydraulic pressure cylinder. A brace plunger or jack plunger 41 is slidably mounted through the open upper end of the cylinder 40, and at its lower end has a resilient sealing collar 42 which nicely engages the smooth inner surface of the cylinder. The upper end of the plunger 41 is pinned or bolted at 43 between lugs 44 secured or welded to the under side of the frame bight 11 at a medial point, so that the plunger stands vertically in the frame. A cap nut 45 is threaded at 46 on the upper end of the cylinder 40 and has a gland or packing assembly 47 for sealing around the plunger 41. This cap nut also has a rim 48 which bears against the upper end of a larger tubular member 49 which fits at its lower end down into an annular recess 50 in the upper end of the base 38, and is pressed tightly against a gasket 51. This member 49 thus forms a supply chamber 52 surrounding the cylinder 40.

A pump cylinder 53 is formed on the plate 34 alongside the hydraulic cylinder assembly and has the vertically extending bore 54 opening upwardly to receive the pump plunger 55. A packing gland 56 seals the cylinder around this plunger, and the plunger has the resilient seal collar 57 at its lower end. A flat post extends upwardly alongside the pump cylinder and an operating member 59 is pivotally connected at 60 to this post. From this pivot point the member 59 extends over the pump plunger 55, to which it is pivotally connected at 61, and has a socket 62 to frictionally receive a removable handle 63 by which the member may be moved upwardly and downwardly to reciprocate the plunger in the bore 54.

The space around the pump and pressure cylinder is built up on the plate 34, as shown at 64, to provide room for the various valves now to be described, and it may be noted that the various parts on the plate 34 may be cast therewith or separately provided and welded thereto, as may be desired.

A check valve bore 65 is drilled in the built up portion of the plate beneath the pump cylinder 53, and is extended, horizontally and parallel, with the adjacent margin of the plate. A wall 66 thus isolates the bores 54 and 65, but a small port 67 cut in the wall provides communication between the bores as shown. Inlet and outlet passages 68 and 69 are also drilled at right angles to the bore 65, and at the same level so that these passages intersect and communicate with the bore. The outer ends of the passages are sealed by plugs 70, and they communicate respectively with the chamber 52, at 71, and with the interior of the pressure cylinder 40, at 72.

The chamber 52 is ordinarily partially filled with hydraulic fluid, or the like, and this fluid may enter the passage 68 at 71 and through the port 67 enter the lower end of the pump cylinder bore 54. An inlet check valve ball 73 located in the bore 65 adjacent the passage 68 permits this action, as will be clearly understood. However, should the plunger 55 be moved downwardly, the pressure on the fluid would move the ball 73 against the seat 73a and seal the passage 68. An outlet check valve ball 74 is also provided in the bore 65 adjacent the passage 69, and the plug 75 sealing the open end of the bore carries a light expansion coil spring 76 which bears against this ball 74 to normally hold it against the seat 77 and seal the passage 69. However, as the pump plunger 55 is reciprocated, the pressure of the fluid in the pump may unseat this ball 74 and flow past into the passage 69 and thence through 72 into the pressure cylinder 40 beneath the plunger 41. Thus, by operating the handle 63, the pump mechanism will take fluid from the storage chamber 52 and transfer it to the pressure cylinder 40 under pressure, which pressure, exerting an upward force against the plunger 41, moves the entire assembly including the pressure block 27 downwardly in the frame 7.

Normally the retractile coil springs 78 stretched between the frame bight 11 and the cap screws 35, as shown, move the pressure assembly upwardly in the frame 7 (Fig. 1), and in this condition the frame may be unlatched and swung aside to insert the hose A. Then, by operating the handle 63 a few times, the hydraulic pressure built up in cylinder 40 will move the pressure block 27 downwardly to pinch the hose (Fig. 3) and shut off the water. The entire hydraulic assembly constitutes a jack by which pressure may be applied to the block 27.

To prevent injury to the hose, a relief port 79 is provided in the cylinder 40 near the top so that when the cylinder moves downwardly on the plunger 41 to a point at which the hose is compressed to a fully closed position, this port will fall just above the lower end of the plunger. Then should the pump be further operated to the point that the rubber of the hose would start to be compressed, the additional movement would bring this port 79 into the clear, allowing the excess pressure to be relieved into the chamber 52.

To release the pressure in the cylinder 40 and allow the hose to be freed, I provide the release valve 80 of the needle type, threaded through a plug 81 which is seated in the outer end of a bore 82 leading into the lower end of the cylinder at 83. A duct 84 connects this bore 82 with the storage chamber 52, but the valve 80 normally seats at 85 between the cylinder and the duct 84. However, by unscrewing the valve slightly, it will be unseated and the fluid may run from the cylinder 40 through the duct 84 and back to the storage chamber. This, of course, totally relieves the pressure in the cylinder 40, and the springs 78 may now pull the pressure block 27 clear of the hose. The hose is then released by unlatching the frame 7 and swinging it aside. This pressure relief valve may also be operated to control the flow of water through the hose. This is done by slightly relieving the hydraulic pressure (by slight release of the valve) so that the pressure block 27 moves upwardly to any desired degree. The water may thus be admitted gradually to the slack section of the hose to prevent the same from threshing about, as would occur were the pressure admitted all in one surge.

From the foregoing it will be evident that I have provided a device by which a heavy hose, such as a fire hose, may be readily pinched to shut off the flow of water for any length of time. The device is compact, is readily connected to or disconnected from the hose, and the power necessary to overcome the pressure in the hose is readily and quickly applied.

It is understood that suitable modifications may be made in the structure as disclosed, provided that such modifications lie within the scope of the appended claims. Having thus fully illustrated and described my invention, what I claim to be new and desire to protect by Letters Patent is:

1. A shut-off device for a hose, comprising hose engaging members normally spaced and yieldably urged apart for receiving a hose therebetween, pressure operated hydraulic jack means for decreasing the space between the members for pinching the hose, and pressure relief means in the said jack means for limiting the extent of said decrease in spacing between the members.

2. A shut-off device for a hose, comprising a base member having a concaved surface for rereciving and positioning a hose laid crosswise thereon, a pressure member slidably supported for movement toward and away from the base member and having a complementary convexed surface for engaging the hose, means for forcibly moving the pressure member toward the base member to thereby pinch the walls of the hose and prevent flowage therethrough, and relief means for automatically limiting the movement of the pressure member toward the base member.

3. A shut-off device for a hose, comprising a base mmeber having a concaved surface for receiving and positioning a hose laid crosswise thereon, a pressure member slidably supported for movement toward and away from the base member and having a complementary convexed surface for engaging the hose, means for forcibly moving the pressure member toward the base member to thereby pinch the walls of the hose and prevent flowage therethrough, relief means cooperating with the means for moving the pressure member for automatically limiting the movement thereof toward the base member, and release means for moving the pressure member away from the base member and retaining any selected spacing therebetween.

4. In a hose shut-off device, a base adapted to support a hose laid thereon, a frame mounted on the base member, a pressure member slidably mounted in the frame and movable toward and away from the base member, a hydraulic cylinder and plunger assembly braced between the frame and the pressure member, a supply chamber for hydraulic fluid, a pump operative for supplying fluid under pressure from the chamber to the cylinder to thereby urge the pressure member against the hose, and the said cylinder having a relief port communicating with the chamber for automatically relieving the pressure in the cylinder after a predetermined length of movement of the pressure member.

5. In a hose shut-off, a base, a frame comprising spaced parallel legs, one leg being hinged to the base at one upper lateral margin thereof, a latch on the other leg, a catch on an opposite upper lateral margin of the base for engagement by the latch, a pressure member slidably mounted between the legs for movement toward and away from the base, and means for actuating the pressure member.

6. In a hose shut-off device, a base adapted to support a hose laid thereon, a frame including legs adapted to rest upon the upper side of the base and to straddle a hose laid on the base, one of the said legs being hinged to one side of the base whereby the other leg may swing clear of the base for placing or removing the hose, a latch member on the free leg and a catch member on the base for releasably locking the frame to the base, a pressure member slidably mounted between the said legs, means for preventing the legs from spreading apart, and means for moving the pressure member toward or away from the base and the hose thereon.

7. In a hose shut-off device, a base adapted to support a hose laid thereon, a frame including legs adapted to straddle a hose laid on the base, one of the said legs being hinged to the base whereby the other leg may swing clear of the base for placing or removing the hose, a latch member on the free leg and a catch member on the base for releasably locking the frame to the base, a pressure member slidably mounted between the said legs, means for adjusting the pressure member, and a stop member extended from the base for engaging the outer side of the latched leg of the frame.

8. A hose shut-off device comprising a base adapted to support a hose laid thereon, a frame swingably mounted on the base member and movable away from the base member while a hose is laid on the base, a pressure member slidably mounted in the frame, a hydraulic, pressure operated, jack cylinder and plunger braced between the frame and pressure member for moving the pressure member toward the base and compressing the hose, means for forcing a fluid under pressure into the cylinder, and the said cylinder having a port adapted to automatically relieve the pressure when the pressure member has compressed the hose to a predetermined degree.

9. A hose shut-off device comprising a base adapted to support a hose laid thereon, a frame swingably mounted on the base member and movable away from the base member while a hose is laid on the base, a pressure member slidably mounted in the frame, a hydraulic, pressure operated, jack cylinder and plunger braced between the frame and pressure member for moving the pressure member toward the base and compressing the hose, means for forcing a fluid under pressure into the cylinder, and the said cylinder having a port normally sealed by the piston but disposed in a position at which it will be opened to relieve the pressure in the cylinder after the pressure member has been moved toward the base to a predetermined position.

WILLIAM W. BRITTAIN.